US012662620B1

(12) United States Patent
Al-Radhi et al.

(10) Patent No.: US 12,662,620 B1
(45) Date of Patent: Jun. 23, 2026

(54) COMPLETION FLUID FOR INJECTION INTO WELLBORE

(71) Applicant: KING FAHD UNIVERSITY OF PETROLEUM AND MINERALS, Dhahran (SA)

(72) Inventors: Naji Ali Mohammed Al-Radhi, Dhahran (SA); Mobeen Murtaza, Dhahran (SA); Muhammad Shahzad Kamal, Dhahran (SA); Umer Zahid, Dhahran (SA); Syed Muhammad Shakil Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/057,363

(22) Filed: Feb. 19, 2025

(51) Int. Cl.

| | |
|---|---|
| ***C09K 8/584*** | (2006.01) |
| ***C09K 8/588*** | (2006.01) |
| ***E21B 43/16*** | (2006.01) |
| *E21B 33/14* | (2006.01) |
| *E21B 43/116* | (2006.01) |

(52) U.S. Cl.
CPC .............. *C09K 8/584* (2013.01); *C09K 8/588* (2013.01); *E21B 43/16* (2013.01); *E21B 33/14* (2013.01); *E21B 43/116* (2013.01)

(58) Field of Classification Search
CPC ...................................................... C09K 8/584
See application file for complete search history.

(56) References Cited

U.S. PATENT DOCUMENTS

| | | | | |
|---|---|---|---|---|
| 9,670,397 | B2 | 6/2017 | Ghumare et al. | |
| 11,236,264 | B2 | 2/2022 | Kalgaonkar et al. | |
| 11,292,957 | B2 | 4/2022 | Kamal et al. | |
| 11,858,878 | B2 | 1/2024 | Hussain et al. | |
| 2021/0039060 | A1 * | 2/2021 | Weerasooriya ......... | E21B 43/16 |

OTHER PUBLICATIONS

Zeeshan Tariq et al., "Polyoxyethylene Quaternary Ammonium Gemini Surfactants as a Completion Fluid Additive to Mitigate Formation Damage", SPE Drilling & Completion, vol. 35, Issue 4, Dec. 17, 2020, pp. 696-706, 4 pages.

Y. Yue, et al., "Improving wellbore stability of shale by adjusting its wettability", Journal of Petroleum Science and Engineering, vol. 161, Dec. 9, 2017, pp. 692-702.

* cited by examiner

*Primary Examiner* — William D Hutton, Jr.
*Assistant Examiner* — Avi T Skaist
(74) *Attorney, Agent, or Firm* — Oblon, McClelland, Maier & Neustadt, L.L.P.

(57) ABSTRACT

A method of completing a wellbore in a hydrocarbon-containing subterranean formation includes injecting a completion fluid into the wellbore to form a hydrostatic gradient at a hydrocarbon-producing depth in the wellbore. The completion fluid is an aqueous solution including 10 to 20 w/v % of a dicationic surfactant of Formula (I) having an alkyl linker and a lipophilic tail. The completion fluid reduces a torque of the wellbore by at least 25% at a temperature of at least 150° F.

20 Claims, 4 Drawing Sheets

Packer Fluid (NaCl) with Surfactant B

Tubing Fluid ($CaCl_2$) with Surfactant A

Tubing Fluid ($CaCl_2$) with Surfactant B

COMPLETION FLUID FOR INJECTION INTO WELLBORE

CROSS-REFERENCE TO RELATED APPLICATION

The present disclosure claims the benefit of Saudi Patent Application No. 1020251101, filed Feb. 18, 2025, with the Saudi Authority for Intellectual Property Office, which is incorporated herein by reference in its entirety.

BACKGROUND

Technical Field

The present disclosure is directed towards completion fluid for injection into wellbores in a subterranean geological formation, and more particularly, towards a method of completing a wellbore by injecting a completion fluid therein.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Completion brines are specialized drilling fluids used in the oil and gas industry during the completion phase of well operations. Completion brines are used to stabilize the wellbore, control pressures, and minimize damage to the production zone. Surfactants may aid in the function of completion brines by modifying the interfacial tension between fluids in the wellbore, improving the efficiency of fluid displacement, and ensuring thorough removal of residual drilling fluids, filter cake, and debris from the wellbore. The formulation of completion fluids may be tailored to suit the conditions and goals of each well completion operation.

Despite the widespread use of surfactants in completion fluids, commercial surfactants are not customized for the specific environments found in wellbores, leading to reduced effectiveness in modifying interfacial tensions under the variable conditions of temperature and salinity typical of wellbores. Such limitations highlight the need for developing a kind surfactant that is tailored to meet the specific challenges of the oil and gas industry.

Accordingly, one object of the present disclosure is to provide a completion fluid composition for a method of completing a wellbore in a subterranean geological formation.

SUMMARY

In an exemplary embodiment, a method of completing a wellbore in a hydrocarbon-containing subterranean formation is described. The method comprises injecting a completion fluid into the wellbore to form a hydrostatic gradient at a hydrocarbon-producing depth in the wellbore. The completion fluid is an aqueous solution comprising 10 to 20 w/v % of a dicationic surfactant of Formula I having an alkyl linker and a lipophilic tail Formula (I)

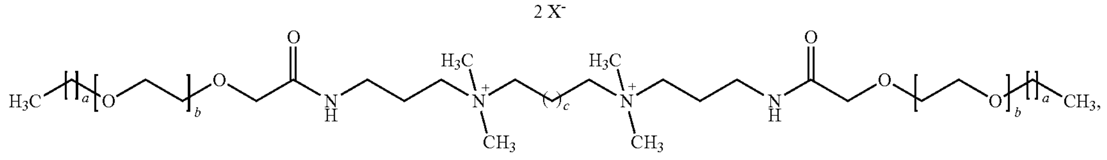

where c is 1 to 20 and represents the alkyl linker, X represents an anionic counterion, a is 1 to 20 and represents the lipophilic tail, and b is from 1 to 20. The completion fluid reduces a torque of a drill bit drilling in the wellbore by at least 25% at a temperature of at least 150° F. in comparison to drilling without a completion fluid that does not contain the surfactant of Formula I.

In some embodiments, the completion fluid is an aqueous solution comprising a brine comprising at least one selected from the group consisting of an alkali metal salt and an alkaline earth metal salt.

In some embodiments, the completion fluid has a density of 1 to 3 g/cm$^3$.

In some embodiments, the completion fluid has a viscosity of 1 to 20 cP.

In some embodiments, method further comprises, before injecting, inserting a steel casing string into the wellbore, then sealing a perimeter of the wellbore formed by the casing string by pumping a cement slurry into an annulus between the wellbore wall and the steel casing string. Furthermore, curing the cement slurry to encase the perimeter of the wellbore in a cement coating, followed by inserting a perforating gun into the wellbore and shooting the perforating gun to create a plurality of openings in the perimeter of the wellbore and the cement coating.

In some embodiments, the anionic counterion is at least one selected from the group including of chlorine and bromine.

In some embodiments, the completion fluid is an aqueous solution including a brine including at least one selected from the group including sodium chloride (NaCl), potassium chloride (KCl), sodium bicarbonate ($NaHCO_3$), sodium hydroxide (NaOH), calcium chloride ($CaCl_2$) calcium carbonate ($CaCO_3$), magnesium sulfate ($MgSO_4$), barium sulfate ($BaSO_4$), strontium chloride ($SrCl_2$), potassium hydroxide (KOH), lithium bicarbonate ($LiHCO_3$), sodium carbonate ($Na_2CO_3$), and potassium nitrate ($KNO_3$).

In some embodiments, the completion fluid has a density of 1.2 $g/cm^3$ to 2 $g/cm^3$.

In some embodiments, the anionic counterion is bromine.

In some embodiments, the completion fluid has a lubricity coefficient of 0.05 to 0.3 at a temperature of 150° F. to 300° F.

In some embodiments, the completion fluid further comprises at least one additive selected from the group consisting of emulsifiers, viscosifiers, fluid-loss control agents, corrosion inhibitors, defoamers, anti-scalants, deflocculants, lubricants, wellbore strengthening materials, high temperature/high pressure control additives, and coating enhancement agents.

In some embodiments, the completion fluid is an aqueous solution comprising a brine comprising at least one selected from the group consisting of NaCl and $CaCl_2$.

In some embodiments, the completion fluid is an aqueous solution comprising a brine comprising NaCl.

In some embodiments, the completion fluid has a lubricity coefficient of 0.06 to 0.13 at a temperature of 150° F. to 300° F.

In some embodiments, the completion fluid reduces a torque of the wellbore by at least 50% at a temperature of at least 150° F.

In some embodiments, the completion fluid is an aqueous solution comprising a brine comprising $CaCl_2$.

In some embodiments, the completion fluid has a density of 1.2 $g/cm^3$ to 1.6 $g/cm^3$.

In some embodiments, the completion fluid has a viscosity of 1 cP to 6 cP.

In some embodiments, the brine has a density of 50 to 75 pounds per cubic foot (pcf).

In some embodiments, the completion fluid has a lubricity coefficient of 0.07 to 0.19 at a temperature of 150° F. to 300° F.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
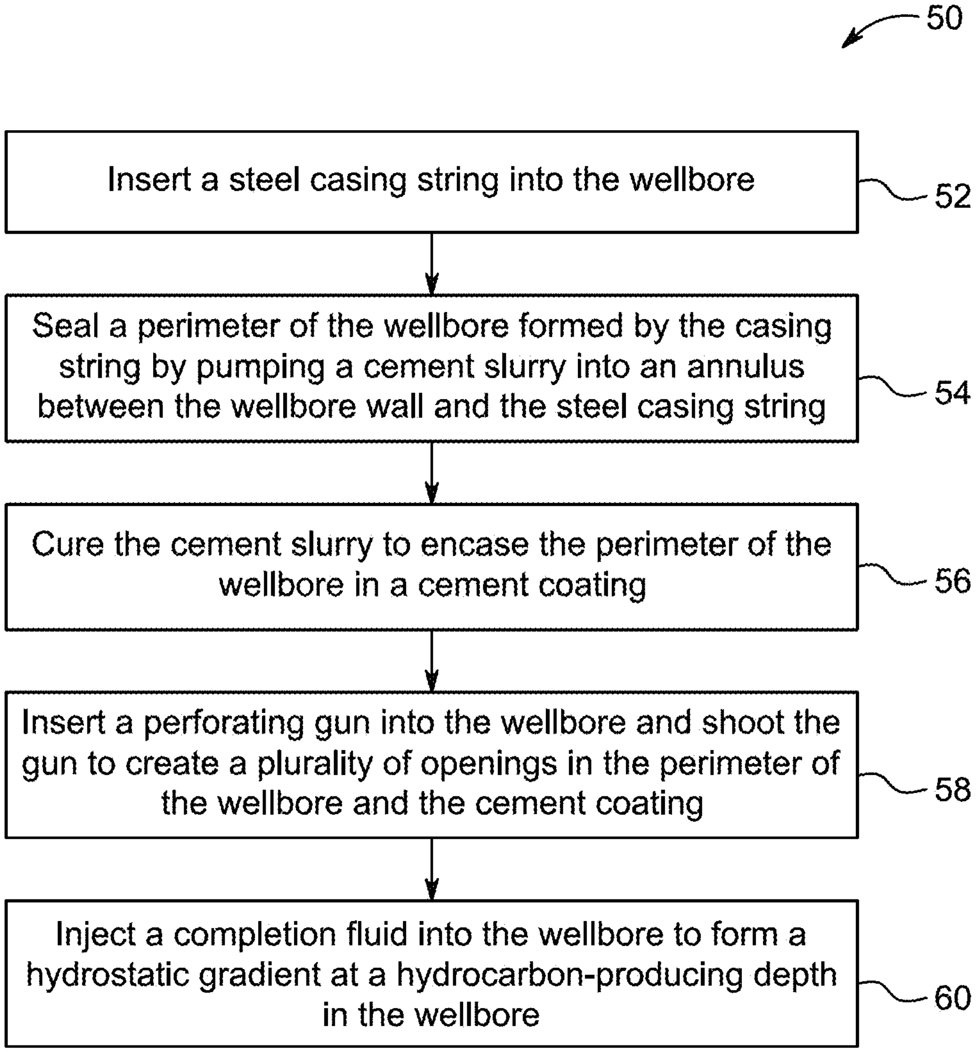
FIG. 1 is an exemplary flow chart of a method of completing a wellbore in a hydrocarbon-containing subterranean formation, according to certain embodiments.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

As used herein, the term “wellbore” refers to the hole or shaft drilled into the earth’s surface to access underground formations, such as oil, gas, or water reservoirs. It is typically created through drilling operations and can vary in depth and diameter depending on the target formation and the specific requirements of the drilling process. The wellbore serves as the conduit for the extraction of fluids or gases, and can also be used for injecting fluids, including chemicals like scale inhibitors, for reservoir management or enhanced recovery processes.

As used herein, the term “subterranean geological formation” refers to a naturally occurring layer or stratum of rock, sediment, or soil located beneath the earth’s surface. These formations often contain valuable resources such as oil, gas, minerals, or groundwater. Subterranean geological formations are typically accessed through wellbores drilled into the earth for exploration or extraction purposes.

As used herein, ‘cement slurry’ refers to a liquid mixture of water, cement, and chemical additives used in oil and gas wells to fill the space between the casing and the wellbore. The slurry forms a solid barrier that prevents fluids from migrating into underground water sources As used herein, the term ‘surfactant’ refers to a compound that lowers the surface tension (or interfacial tension) between two liquids, between a liquid and a gas, or between a liquid and a solid. Surfactants added to completion fluids aid in reducing interfacial tension between oil and water and alter the wettability of the rock surface, allowing for better oil displacement by the completion fluid.

As used herein, the term ‘dicationic surfactant’ refers to the type of surfactant that carries two positive charges (cationic), e.g., on a hydrophilic head group. Due to their dual positive charges, they tend to have enhanced adsorption to negatively charged surfaces and materials.

As used herein, the term, ‘viscosity’ is a measure of a fluid’s resistance to flow or deformation. It describes the internal friction within a fluid that arises from the interactions between its molecules. Higher viscosity indicates a thicker fluid that flows more slowly while lower viscosity indicates a thinner fluid that flows more easily. Viscosity is typically measured in units of pascal-seconds (Pa-s) or centipoise (cP). A high viscosity completion fluid increases the frictional pressure drop within the wellbore, requiring higher pumping pressure to circulate the fluid. A completion fluid with a low viscosity may not adequately lift cuttings or provide sufficient stability against formation damage depending on the reservoir conditions.

As used herein, the term, ‘density’ is the mass of a substance per unit volume. It is a physical property that indicates how compact the matter within a substance is. Density is commonly measured in units of kilograms per cubic meter ($kg/m^3$), pounds per cubic foot (pfc), or grams per milliliter (g/mL). The density of a completion fluid affects its ability to balance the pressure within a wellbore, with higher density fluids providing greater hydrostatic pressure to counteract formation pressure.

As used herein, 'specific gravity' refers to the ratio of the density of a substance to the density of a standard, usually water for a liquid or solid, and air for a gas. A completion fluid with a higher specific gravity provides better downhole pressure control and can help lift heavier formations to the surface of the wellbore.

As used herein, 'alkyl linker' refers to a short chain of carbon atoms bonded to hydrogen atoms (an alkyl group) that is used to connect two different molecules or parts of a molecule. It typically serves as a spacer or bridge between functional groups, allowing them to interact or maintain specific spatial arrangements in chemical or biological systems.

As used herein, the term "anionic counterion" refers to a negatively charged ion that is attracted to a positively charged ion, or cation. Counterions are ions that have a charge opposite to the substance they are associated with.

As used herein, 'hydrostatic gradient' refers to the rate at which pressure increases with depth in a fluid. It is typically expressed as the pressure difference per unit depth and is influenced by the fluid's density and the gravitational pull.

As used herein, the term, 'a lipophilic tail' is the hydrophobic part of a molecule, typically found in amphiphilic compounds like detergents, surfactants, or phospholipids. It is composed of long hydrocarbon chains that are attracted to fats and oils but do not interact well with water.

As used herein, the term, 'the lubricity coefficient' is a measure of a material's ability to reduce friction and wear when in contact with another surface. It indicates how effectively a lubricant can create a smooth, low-friction interface between two surfaces, minimizing damage. A higher lubricity coefficient suggests better lubrication performance, leading to reduced friction, less wear, and extended drilling equipment life.

As used herein, the term 'brine' or 'brine solution' refers to an aqueous solution containing dissolved salts, where the concentration of dissolved salts is sufficiently high to achieve desired properties such as increased ionic strength, enhanced solubility of gases (such as $CO_2$), or to facilitate specific chemical reactions.

As used herein, the term 'curing' refers to the process by which a cement slurry undergoes chemical hydration and hardens over time to form a solid, durable structure. This process involves the chemical reaction between the cement and water, which leads to the formation of a strong bond that encases the wellbore, sealing it and providing structural integrity. Curing can occur naturally at ambient temperatures or can be accelerated or controlled using various methods such as heat, pressure, or chemical additives to ensure the cement reaches the desired strength within a specified time.

Aspects of the present disclosure are directed toward the use of a dicationic surfactant in a completion fluid as an alternative to conventional completion fluids for use in both offshore and onshore completion operations. The dicationic surfactant is evaluated for its stability, lubricity, compatibility, and its effect on fluid properties, such as density and homogeneity, when added to an aqueous solution completion fluid.

FIG. 1 illustrates a flow chart of a method 50 of completing a wellbore in a hydrocarbon-containing subterranean formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 comprises inserting a steel casing string into the wellbore. At step 54, the method 50 comprises sealing a perimeter of the wellbore formed by the casing string by pumping a cement slurry into an annulus between the wellbore wall and the steel casing string. In some embodiments, a steel casing string is inserted into the wellbore, and centralizers are used for proper alignment of the steel casing string so that the casing is kept from touching the wall of the wellbore. Cement slurry is pumped into the annular space between the casing and wellbore, filling the annulus and forming a permanent seal once set. In other embodiments, an integrated cementing tool positioned at the bottom of the casing activates upon reaching the target depth, allowing cement slurry to flow into the annulus and displace drilling fluids, forming a seal after curing. In some embodiments, a dual stage cementing process is utilized, where a first cement stage bonds the casing, followed by an inflatable packer to improve seal integrity, and a second stage of cement is pumped to ensure complete filling and bonding strength. In another embodiment, a foam cement slurry is pumped into the annulus, filling the space, and setting into a seal. In some embodiments, the sealing of the wellbore comprises a jetting cementing process, where a jetting tool with high-pressure nozzles injects cement slurry into the annular space for even distribution, forming a strong seal after setting.

At step 56, the method 50 comprises curing the cement slurry to encase the perimeter of the wellbore in a cement coating. In some embodiments, the cement slurry is cured naturally at wellbore temperature, setting under static conditions to form a durable coating around the wellbore perimeter. In other embodiments, an accelerator is added to the cement slurry to speed up hydration, reducing curing time. In further embodiments, external heating elements, such as electric cables or jackets, are used to maintain desired curing temperature. In yet another embodiment, a combination of retarders and accelerators is used to control the setting time, ensuring proper slurry placement before accelerating the curing. In additional embodiments, pressure is applied to the wellbore to prevent fluid migration and promote proper cement bonding during curing. In another embodiment, foam cement is used, curing through gas expansion and hydration to form a lightweight, coating around the wellbore.

At step 58, the method 50 comprises inserting a perforating gun into the wellbore and shooting the gun to create a plurality of openings in the perimeter of the wellbore and the cement coating. In some embodiments, a perforating gun is lowered into the wellbore and fired to create a series of openings in the wellbore wall and cement coating. In other embodiments, the perforating gun is equipped with shaped charges, which are detonated upon reaching the target depth, creating multiple perforations in both the wellbore and the cement layer. In further embodiments, a wireline-deployed perforating gun is used, allowing for precise control over the shooting depth and placement of the openings in the wellbore and cement. Additional embodiments involve the use of a coiled tubing-deployed perforating gun, enabling continuous operation and efficient creation of perforations in the cement and wellbore.

At step 60, the method 50 comprises injecting a completion fluid into the wellbore to form a hydrostatic gradient at a hydrocarbon-producing depth in the wellbore. In some embodiments, completion fluid is injected into the wellbore to create a hydrostatic gradient, balancing formation pressure at the target depth, to achieve a desired hydrostatic pressure at the target depth. In further embodiments, completion fluid is pumped continuously into the wellbore, maintaining a steady hydrostatic gradient to prevent formation influx. In yet another embodiment, a multi-stage injection method is utilized by first introducing lighter fluids, then heavier fluids to establish desired hydrostatic pressures at various depths. In additional embodiments, gas-lift and completion fluid are injected together to maintain the hydrostatic gradient. In yet another embodiment, fluid injection is controlled with a pump system that adjusts to maintain the desired hydrostatic gradient based on real-time pressure measurements. In some embodiments, the completion fluid is a gel-based fluid. In this embodiment, the gel-based fluid is injected to reduce fluid loss and maintain the hydrostatic gradient during completion.

In an embodiment, the completion fluid is an aqueous solution comprising 10 to 20 w/v % of a dicationic surfactant of Formula (I) having an alkyl linker and a lipophilic tail Formula (I)

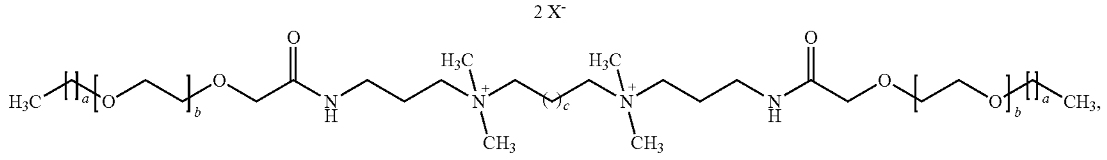

where c represents the alkyl linker, X represents an anionic counterion, a represents the lipophilic tail, and b represents a non-zero integer. In an embodiment, a, b, and c individually represent a non-zero integer of 1 to 20. In another embodiment, a, b, and c individually represent a non-zero integer of 2 to 19, preferably 3 to 18, preferably 4 to 18, preferably 5 to 18, preferably 6 to 18, preferably 7 to 18, preferably 8 to 18, preferably 9 to 18, most preferably 10 to 18. In another embodiment, a, b, and c individually represent a non-zero integer of 1 to 20, such as 1, 2, 3, 4, 5, 6, 7, 8, 9, 10, 11, 12, 13, 14, 15, 16, 17, 18, 19, or 20. An anionic counterion in a surfactant may impacts its surface activity by affecting the critical micelle concentration (CMC) due to the electrostatic interactions between the negatively charged surfactant head group and the positively charged counterion. A smaller, more strongly bound counterion may lower the CMC, enhancing the surfactant's effectiveness. Suitable examples of anionic counterions include, but are not limited to, halides, such as fluoride, chloride, bromide, iodide, nitrate, sulfate, phosphate, amide, methanesulfonate, ethanesulfonate, p-toluenesulfonate, salicylate, malate, maleate, succinate, tartrate, citrate, acetate, perchlorate, trifluoromethanesulfonate (triflate), acetylacetonate, hexafluorophosphate, and hexafluoroacetylacetonate. In some embodiments, the anionic counterion is at least one halide selected from the group consisting of chloride or bromide. In a preferred embodiment, the anionic counterion is bromine. In one embodiment, the completion fluid is an aqueous solution comprising 10 to 20 w/v % of a dicationic surfactant of Formula (I) relative to a total volume of the aqueous solution. In another embodiment, the completion fluid is an aqueous solution comprising 10 to 19.5 w/v %% of the dicationic surfactant of Formula (I), preferably 10 to 19 w/v %%, preferably 10 to 18.5 w/v %%, preferably 10 to 18 w/v %%, preferably 10 to 17.5 w/v %%, preferably 10 to 17 w/v %%, preferably 10 to 16.5 w/v %%, preferably 10 to 16 w/v %%, preferably 10 to 15.5 w/v %%, preferably 10 to 15 w/v %%, preferably 10 to 14.5 w/v %%, preferably 10 to 14 w/v %%, preferably 10 to 13.5 w/v %%, preferably 10 to 13 w/v %%, preferably 10 to 12.5 w/v %%, preferably 10 to 12 w/v %%, preferably 10 to 11.5 w/v %%, preferably 10 to 11 w/v %%, most preferably 10 to 10.5 w/v %%. In a preferred embodiment, the completion fluid is an aqueous solution comprising 10 w/v %% of the dicationic surfactant of Formula (I) relative to a total volume of the aqueous solution.

In another embodiment, the completion fluid is an aqueous solution comprising a brine comprising at least one selected from the group of an alkali metal salt and an alkaline earth metal salt. Suitable alkali metal salts may include, but are not limited to, sodium chloride, potassium chloride, lithium bromide, sodium bicarbonate, potassium nitrate, lithium carbonate, sodium sulfate, potassium iodide, sodium hydroxide, potassium permanganate, lithium sulfate, sodium phosphate, potassium hydroxide, sodium acetate, lithium chloride. Suitable alkaline earth metal salts, may include, but are not limited to, calcium chloride, magnesium sulfate, barium nitrate, calcium carbonate, magnesium chloride, strontium chloride, barium sulfate, calcium phosphate, magnesium bicarbonate, calcium hydroxide, strontium nitrate, barium chloride, magnesium carbonate, calcium sulfate, barium acetate. In some embodiments, the completion fluid is an aqueous solution comprising a brine comprising at least one selected from the group consisting of NaCl, KCl, $NaHCO_3$, NaOH, $CaCl_2$, $CaCO_3$, $MgSO_4$, $BaSO_4$, $SrCl_2$, KOH, $LiHCO_3$, $Na_2CO_3$, and $KNO_3$. In one embodiment, the completion fluid is an aqueous solution comprising a brine comprising at least one selected from the group consisting of NaCl and $CaCl_2$. In a specific embodiment, the completion fluid is an aqueous solution comprising a brine comprising NaCl. In another specific embodiment, the completion fluid is an aqueous solution comprising a brine comprising $CaCl_2$. In some embodiments, the completion fluid is an aqueous solution comprising a brine comprising 40 to 80 pounds (lb) of at least one selected from the group of an alkali metal salt and an alkaline earth metal salt, preferably 42 to 78 lb, preferably 44 to 76 lb, preferably 46 to 74 lb, preferably 48 to 72 lb, preferably 50 to 70 lb, preferably 52 to 70 lb, preferably 54 to 70 lb, most preferably 56 to 70 lb. In a specific embodiment, the completion fluid is an aqueous solution comprising a brine comprising 68.68 of NaCl. In another specific embodiment, the completion fluid is an aqueous solution comprising a brine comprising 57.8 of $CaCl_2$.

In some embodiments, the brine comprises at least one selected from the group consisting of an alkalinity agent, a surfactant, and a bactericide. Alkalinity agents may be added to a brine for a completion fluid to function as a buffer, thus preventing rapid pH changes of the completion fluid during use. Alkalinity agents may also aid in preventing corrosion within the wellbore by neutralizing acidic components, such as carbon dioxide, while also helping to maintain the stability and performance of other additives within the completion fluid. Suitable examples of alkalinity agents include, but are not limited to, $Na_2CO_3$, $NaHCO_3$, $Ca(OH)_2$, $Mg(OH)_2$, KOH, and NaOH. In some embodiments, the brine comprises at least one alkalinity agent selected from the group consisting of $Na_2CO_3$, $NaHCO_3$, $Ca(OH)_2$, $Mg(OH)_2$, KOH, and NaOH. In another embodiment, the brine comprises at least one alkalinity agent selected from the group consisting of $Ca(OH)_2$ and NaOH. In some embodiments, the brine comprises 0.05 to 1 barrel (bbl) of base fluid. In another embodiment, the brine comprises 0.1 to 1 bbl of base fluid, preferably 0.15 to 1 bbl, preferably 0.20 to 1 bbl, preferably 0.25 to 1 bbl, preferably 0.30 to 1 bbl, preferably 0.35 to 1 bbl, preferably 0.40 to 1 bbl, preferably 0.45 to 1 bbl, preferably 0.50 to 1 bbl, preferably 0.55 to 1 bbl, preferably 0.60 to 1 bbl, preferably 0.65 to 1 bbl, preferably 0.70 to 1 bbl, preferably 0.75 to 1 bbl, preferably 0.80 to 1 bbl, preferably 0.85 to 1 bbl, preferably 0.90 to 1 bbl, most preferably 0.95 to 1 bbl of base fluid. In a preferred embodiment, the brine comprises 0.995 bbl of base fluid. In a specific embodiment, the alkalinity agent is NaOH. In another specific embodiment, the alkalinity agent is $Ca(OH)_2$. In some embodiments, the brine comprises 0.05 to 0.50 parts per billion (ppb) of the alkalinity agent relative to a total volume of the brine. In another embodiment, the brine comprises 0.1 to 0.45 ppb of alkalinity agent, preferably 0.15 to 0.40 ppb, most preferably 0.20 to 0.35 ppb of the alkalinity agent. In a specific embodiment, the brine comprises 0.35 ppb of NaOH. In another specific embodiment, the brine comprises 0.20 ppb of $Ca(OH)_2$. A biocide added to completion fluid controls bacterial growth, preventing issues like corrosion, biofilm formation, and the production of harmful gases like hydrogen sulfide by inhibiting the activity of sulfate-reducing bacteria. Suitable biocides include, but are not limited to, quaternary ammonium compounds, glutaraldehyde, dimethyloxazolidine (DMO), tris(hydroxymethyl)nitromethane (THNM), tetrakis(hydroxymethyl)phosphonium chloride (THPC), and alkyldimethylbenzylammonium chloride (ADBAC). In some embodiments, the brine comprises 0.01 to 0.1 gallon per barrel (gpb) of the biocide. In another embodiment, the brine comprises 0.015 to 0.095 ppb of the biocide, preferably 0.02 to 0.090 ppb, preferably 0.025 to 0.085 ppb, preferably 0.03 to 0.08 bbl, preferably 0.035 to 0.075 ppb, preferably 0.04 to 0.07 ppb, preferably 0.045 to 0.065 ppb, preferably 0.05 to 0.06 ppb, most preferably 0.05 to 0.055 ppb of the biocide. In a preferred embodiment, the brine comprises 0.05 ppb of the biocide. An oxygen scavenger may be added to a brine to remove dissolved oxygen, preventing corrosion of downhole equipment like casing and drill pipe by eliminating the primary agent responsible for oxidation and rusting. Examples of oxygen scavengers include sodium sulfite, sodium bisulfite, hydrazine, hydroxylamine, and ascorbic acid. In some embodiments, the brine comprises 0.05 to 0.50 ppb of the oxygen scavenger. In another embodiment, the brine comprises 0.10 to 0.45 ppb of the oxygen scavenger, preferably 0.15 to 0.40 ppb, preferably 0.15 to 0.35 ppb, preferably 0.15 to 0.30 ppb, preferably 0.15 to 0.25 ppb, most preferably 0.15 to 0.20 of the oxygen scavenger. In a specific embodiment, the brine comprises 0.20 ppb of the oxygen scavenger. In another specific embodiment, the brine comprises 0.15 ppb the oxygen scavenger. By adding more than one surfactant in a completion fluid, a synergistic improvement in oil recovery may occur by significantly reducing interfacial tension between the oil and water phases, leading to better wettability alteration and increased fluid displacement within the wellbore. Suitable surfactants that may be added to a completion fluid comprising a dication surfactant include alkyl polyglycosides (APGs), alcohol ethoxylates, fatty acid alkanolamides, polyoxyethylene alkyl ethers, sorbitan esters, and ethoxylated fatty alcohols. In another embodiment, the brine comprises 0.50 to 3.5 v/v % of a surfactant relative to a total volume of the brine. In some embodiments, the brine comprises 1 to 3 v/v % of the surfactant, preferably 1.5 to 2.5 v/v %, most preferably 1.5 to 2 v/v % of the surfactant. In a specific embodiment, the brine comprises 1.5 v/v % of the surfactant. In another specific embodiment, the brine comprises 2 v/v % of the surfactant.

In some embodiments, the brine has a density of 50 to 80 pcf. In another embodiment, the brine has a density of 52 to 78 pcf, preferably 54 to 76 pcf, preferably 56 to 74 pcf, preferably 58 to 72 pcf, preferably 60 to 70 pcf, preferably 62 to 70 pcf, preferably 64 to 70 pcf, preferably 66 to 70 pcf, most preferably 68 to 70 pcf. In a specific embodiment, the brine has a density of 69.8 pcf. In another specific embodiment, the brine has a density of 70.4 pcf. In some embodiments, the brine has a specific gravity of 1 to 2, preferably 1.05 to 1.95, preferably 1.1 to 1.9, preferably 1.1 to 1.85, preferably 1.1 to 1.8, preferably 1.1 to 1.75, preferably 1.1 to 1.7, preferably 1.1 to 1.65, preferably 1.1 to 1.6, preferably 1.1 to 1.55, preferably 1.1 to 1.5, preferably 1.1 to 1.45, preferably 1.1 to 1.4, preferably 1.1 to 1.35, preferably 1.1 to 1.3, preferably 1.1 to 1.25, preferably 1.1 to 1.2, most preferably 1.1 to 1.15. In a specific embodiment, the brine has a specific gravity of 1.12. In another specific embodiment, the brine has a specific gravity of 1.13.

In an embodiment, the completion fluid may further comprise at least one additive selected from the group consisting of emulsifiers, viscosifiers, fluid-loss control agents, corrosion inhibitors, defoamers, anti-scalants, deflocculants, lubricants, wellbore strengthening materials, high temperature/high pressure control additives, and coating enhancement agents. Emulsifiers aid in stabilizing the emulsion of small water droplets within the completion fluid, preventing them from coalescing into larger droplets and separating out, thereby maintaining the completion fluids stability during drilling operations. Emulsifiers may also aid in controlling fluid loss by preventing the completion fluid from leaking excessively into the rock pores of the formation. Examples of emulsifiers for completion fluids may include sulfonated hydrocarbons, ethoxylated nonylphenols, and alkali-metal fatty-acid soaps. Viscosifiers added to completion fluids may increase the completion fluid's viscosity, allowing the completion fluid to suspend and carry rock cuttings up the wellbore by creating a thicker, more resistant flow that can withstand the forces of circulation. This improves the completion fluid's ability to clean the wellbore by preventing cuttings from settling to the bottom of the well. Suitable viscosifiers may include, but are not limited to, hydroxyethylcellulose (HEC), attapulgite, polymeric compounds, lignite, and polymer fluids. Fluid-loss control agents in completion fluids work by creating a thin, impermeable filter cake on the wellbore wall, which prevents excessive liquid from leaking out of the completion fluid into the surrounding formation while still allowing cuttings to be carried to the surface. Examples of fluid-loss control agents used in completion fluids include starches (e.g., corn, potato, cassava), polyanionic cellulose (PAC), lignosulfonates, carboxymethyl cellulose (CMC), modified cellulosic materials, bentonite, and certain natural polymers like guar gum or gum arabic. Corrosion inhibitors in water-based completion fluids may reduce the rate of corrosion on the metal surfaces of drilling equipment by forming a protective film on the metal, acting as a barrier between the metal and the corrosive elements within the completion fluid. Suitable corrosion inhibitors include, but are not limited to, phosphates (e.g., orthophosphates), nitrates, molybdates, various organic compounds like fatty acids, sulfonates, and cationic surfactants like cetyl trimethyl ammonium bromide (CTAB). Defoamers work by reducing the surface tension of the completion fluid, which prevents the formation of excessive foam, thereby improving the completion fluid's ability to effectively remove drill cuttings, maintain proper pressure control, and prevent operational issues like pump cavitation. Suitable defoamers include silicone-based compounds, long-chain fatty alcohols, fatty acid soaps, mineral oils, aluminum stearate, and certain types of vegetable oils. Anti-scalants added to completion fluids prevent the formation of mineral deposits (scale) by disrupting the crystallization process, essentially stopping the growth of scale crystals that could block the wellbore and hinder fluid flow. Suitable anti-scalants include but are not limited to polyphosphinocarboxylic acid (PPCA), diethylenetriaminepenta(methylene phosphonic acid) (DTPMP), organophosphonates, and polymeric phosphonates. Deflocculants may help disperse solid particles within the completion fluid by neutralizing the particles' surface charges, effectively reducing the viscosity of the completion fluid, allowing it to flow more freely through the wellbore while drilling. Common deflocculants are lignosulfonates, polyphosphates, quebracho extract, and tannins. Lubricants in the completion fluid may aid in reducing friction between the drill string and the rock formations, lowering drag and torque, thereby improving drilling efficiency. Common lubricants include graphite, lignosulfonates, polyethylene glycols (PEGs), synthetic polymers like polyacrylamide, and various fatty acids (e.g., stearic acid). Wellbore strengthening materials may be added to completion fluids to increase the completion fluid's ability to plug microfractures in the wellbore, thereby enhancing the formation's stability and preventing fluid loss by sealing cracks and improving the overall strength of the wellbore wall. Suitable examples of wellbore strengthening materials include, but are not limited to, asphaltite and graphite. High temperature/high pressure control additives such as polyacrylamide derivatives, modified cellulose polymers, sulfonated polymers, and silicates, may be added to completion fluids to enhance the stability of the completion fluid and mitigating the degradation effects of high temperature and pressure on the completion fluid. Coating enhancement agents may be added to completion fluids to create a protective layer on the surface of drill cuttings and formation rock, preventing them from interacting excessively with the completion fluid, which helps maintain stability of the wellbore by minimizing swelling, dispersion, and sticking issues, especially in formations prone to clay instability or high-pressure/high-temperature conditions. Suitable examples of coating enhancement agents include, but are not limited to, PAM, lignosulfonates, CMC, starch, guar gum, xanthan gum, and quebracho.

In some embodiments, the completion fluid has a viscosity of 1 to 20 cP, preferably 1 to 19 cP, preferably 1 to 18 cP, preferably 1 to 17 cP, preferably 1 to 16 cP, preferably 1 to 15 cP, preferably 1 to 14 cP, preferably 1 to 13 cP, preferably 1 to 12 cP, preferably 1 to 11 cP, preferably 1 to 10 cP, preferably 1 to 9 cP, preferably 1 to 8 cP, preferably 1 to 7 cP, most preferably 1 to 6 cP.

In some embodiments, the completion fluid has a density of 1 to 3 g/$cm^3$. In another embodiment, the completion fluid has a density of 1.05 to 2.95 g/$cm^3$, preferably 1.1 to 2.9 g/$cm^3$, preferably 1.15 to 2.85 g/$cm^3$, preferably 1.2 to 2.8 g/$cm^3$, preferably 1.2 to 2.75 g/$cm^3$, preferably 1.2 to 2.7 g/$cm^3$, preferably 1.2 to 2.65 g/$cm^3$, preferably 1.2 to 2.6 g/$cm^3$, preferably 1.2 to 2.55 g/$cm^3$, preferably 1.2 to 2.5 g/$cm^3$, preferably 1.2 to 2.45 g/$cm^3$, preferably 1.2 to 2.4 g/$cm^3$, preferably 1.2 to 2.35 g/$cm^3$, preferably 1.2 to 2.3 g/$cm^3$, preferably 1.2 to 2.25 g/$cm^3$, preferably 1.2 to 2.2 g/$cm^3$, preferably 1.2 to 2.15 g/$cm^3$, preferably 1.2 to 2.1 g/$cm^3$, preferably 1.2 to 2.05 g/$cm^3$, preferably 1.2 to 2 g/$cm^3$, preferably 1.2 to 1.95 g/$cm^3$, preferably 1.2 to 1.9 g/$cm^3$, preferably 1.2 to 1.85 g/$cm^3$, preferably 1.2 to 1.8 g/$cm^3$, preferably 1.2 to 1.75 g/$cm^3$, preferably 1.2 to 1.7 g/$cm^3$, preferably 1.2 to 1.65 g/$cm^3$, most preferably 1.2 to 1.6 g/$cm^3$.

In some embodiments, the completion fluid has a lubricity coefficient of 0.05 to 0.10 at a temperature of 150 to 300° F., preferably 0.052 to 0.1, preferably 0.054 to 0.1, preferably 0.056 to 0.1, preferably 0.058 to 0.1, preferably 0.06 to 0.1, preferably 0.062 to 0.1, most preferably 0.064 to 0.1 at a temperature of 150 to 300° F. In some embodiments, the completion fluid has a lubricity coefficient of 0.05 to 0.10 at a temperature of 150° F., preferably 0.052 to 0.098, preferably 0.054 to 0.096, preferably 0.056 to 0.094, preferably 0.058 to 0.092, preferably 0.06 to 0.09, preferably 0.062 to 0.088, preferably 0.064 to 0.086, preferably 0.066 to 0.084, preferably 0.068 to 0.082, preferably 0.07 to 0.08, preferably 0.072 to 0.08, most preferably 0.074 to 0.08 at a temperature of 150° F. In a specific embodiment, the completion fluid has a lubricity coefficient of 0.0753 at a temperature of 150° F. In another specific embodiment, the completion fluid has a lubricity coefficient of 0.0784 at a temperature of 150° F. In some embodiments, the completion fluid has a lubricity coefficient of 0.05 to 0.10 at a temperature of 250° F., preferably 0.052 to 0.098, preferably 0.054 to 0.096, preferably 0.056 to 0.094, preferably 0.058 to 0.092, preferably 0.06 to 0.09, preferably 0.062 to 0.088, preferably 0.064 to 0.086, preferably 0.066 to 0.084, preferably 0.068 to 0.082, preferably 0.07 to 0.082, most preferably 0.072 to 0.082 at a temperature of 250° F. In a specific embodiment, the completion fluid has a lubricity coefficient of 0.0814 at a temperature of 250° F. In another specific embodiment, the completion fluid has a lubricity coefficient of 0.0723 at a temperature of 250° F. In some embodiments, the completion fluid has a lubricity coefficient of 0.05 to 0.10 at a temperature of 300° F., preferably 0.052 to 0.10, preferably 0.054 to 0.10, preferably 0.056 to 0.10, preferably 0.058 to 0.10, preferably 0.06 to 0.10, preferably 0.062 to 0.10, most preferably 0.064 to 0.10 at a temperature of 300° F. In a specific embodiment, the completion fluid has a lubricity coefficient of 0.0651 at a temperature of 300° F. In another specific embodiment, the completion fluid has a lubricity coefficient of 0.0998 at a temperature of 300° F.

In some embodiments, the completion fluid reduces a torque of the wellbore by at least 25% at a temperature of at least 150° F. In another embodiment, the completion fluid reduces a torque of the wellbore by at least 30%, preferably at least 35%, preferably at least 40%, preferably at least 45%, preferably at least 50%, preferably at least 55%, preferably at least 60%, most preferably at least 65% at a temperature of 150° F. In another embodiment, the completion fluid reduces a torque of the wellbore by at least 20%, preferably at least 25%, preferably at least 30%, preferably at least 35%, preferably at least 40%, preferably at least 45%, preferably at least 50%, most preferably at least 55% at a temperature of 250° F. In some embodiments, the completion fluid reduces a torque of the wellbore by at least 20%, preferably at least 25%, preferably at least 30%, preferably at least 35%, preferably at least 40%, preferably at least 45%, preferably at least 50%, preferably at least 55%, preferably at least 60%, preferably at least 65%, preferably at least 70%, preferably at least 75%, preferably at least 80%, preferably at least 85%, preferably at least 90%, most preferably at least 95% at a temperature of 300° F.

EXAMPLES

The following examples demonstrate a method of completing a wellbore in a hydrocarbon-containing subterranean formation by injecting a completion fluid. The examples are provided solely for illustration and are not to be construed as limitations of the present disclosure, as many variations thereof are possible without departing from the spirit and scope of the present disclosure.

Example 1: Materials and Methods

Figure 2:
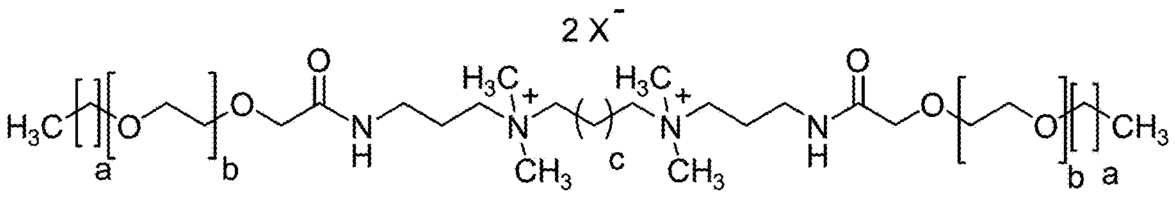
FIG. 2 illustrates an exemplary chemical structure of dicationic surfactant, according to certain embodiments.

In assessing surfactants for use in completion brine formulations of the present disclosure, two types of surfactants were evaluated for their performance. Surfactant A is the synthesized dicationic surfactant of the present disclosure. The synthesized surfactant (e.g., Surfactant A) was synthesized by amidation of fatty acid with amine to create an intermediate amido-amine compound which was further treated with dibromoalkane to form the disclosed dicationic surfactant of Formula (I), as depicted in FIG. 2. Surfactant B is a commercially available surfactant (e.g., a zwitterionic surfactant from Paladin Drill, LLC, 1280 E. FM 1787, Odessa, TX 79766). Both surfactants (e.g., surfactant A and surfactant B) were used at a concentration of 10 weight to volume ratio (w/v %) relative to a total volume of the completion fluid. Two brines were created, one comprising NaCl and one comprising $CaCl_2$. Table 1 lists the components of the NaCl brine while Table 2 lists the components of the $CaCl_2$ brine.

TABLE 1

| NaCl brine components | | | |
|---|---|---|---|
| Product | Unit | Concentration | Function |
| Base fluid | Lab barrel (bbl) | 0.995 | Salt/weight |
| Caustic soda (NaOH) | pound per barrel (ppb) | 0.35 | Alkalinity agent |
| Biocide | gallon per barrel (gpb) | 0.05 | Bactericide |
| $O_2$ Scav | ppb | 0.15 | Oxygen scavenger |
| Surfactant | volume to volume ratio (v/v %) | 1.5 | Surfactant |

TABLE 2

| $CaCl_2$ brine components | | | |
|---|---|---|---|
| Product | Unit | Concentration | Function |
| Base Fluid | Lab barrel (bbl) | 0.995 | Salt/weight |
| Calcium hydroxide ($Ca(OH)_2$) | ppb | 0.2 | Alkalinity agent |
| Biocide | gpb | 0.05 | Bactericide |
| $O_2$ Scavenger | ppb | 0.2 | Oxygen scavenger |
| Surfactant | v/v % | 2 | Surfactant |

Example 2: Density of Brines

Density is an important factor in controlling well control, averting formation damage, facilitating efficient fluid displacement, and strengthening the safety and efficacy of completion operations. The density of both brines were measured using hydrometer. Table 3 provides the densities of both brines conducted at room conditions.

TABLE 3

| Brine properties | | | | | |
|---|---|---|---|---|---|
| Fluid | Salt used | Quantity of salt (lb) | S.G | Density (pcf) | Temperature (° F.) |
| Packer fluid | NaCl | 68.68 | 1.13 | 70.4 | 73° |
| Tubing fluid | $CaCl_2$ | 57.8 | 1.12 | 69.8 | 73° |

Example 3: Friction Reduction of Completion Fluids

Figure 3:
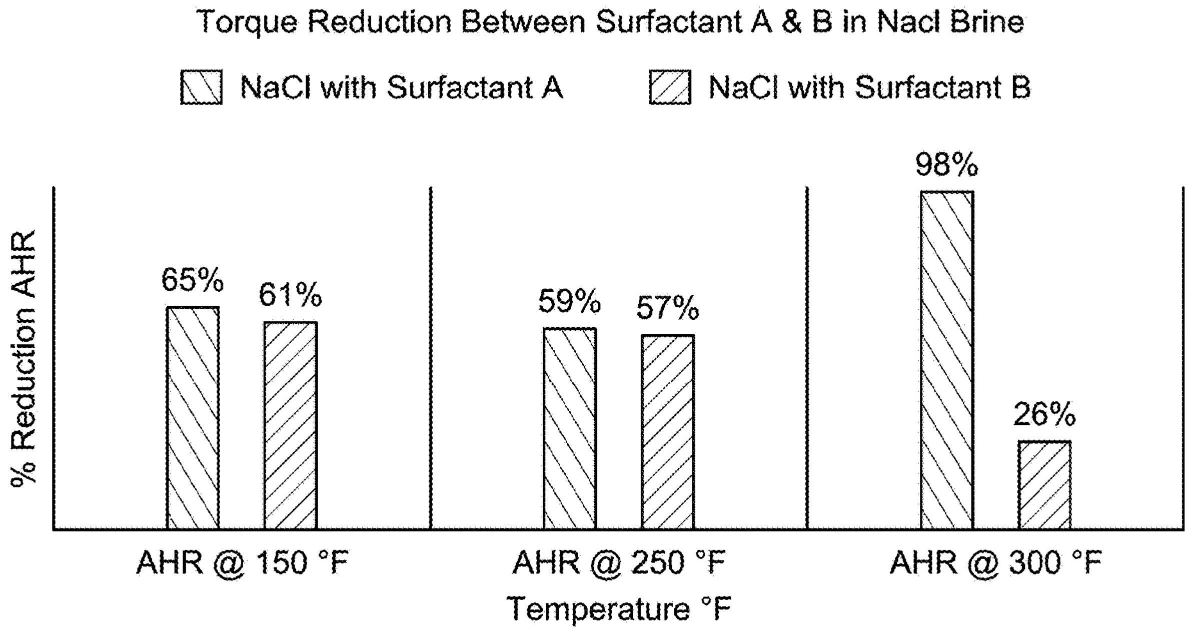
FIG. 3 shows a percentage reduction in torque by surfactant A and surfactant B in sodium chloride (NaCl) brine at different temperatures, according to certain embodiments.
Figure 4:
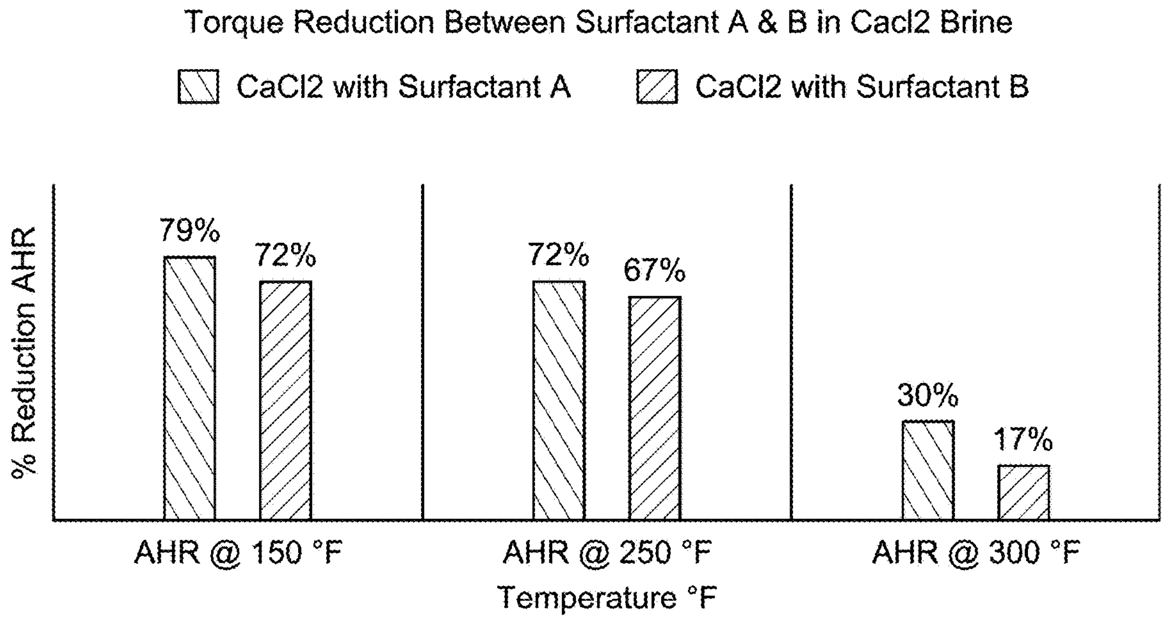
FIG. 4 shows a percentage reduction in torque for both surfactant A and surfactant B in calcium chloride ($CaCl_2$) brine at different temperatures, according to certain embodiments.

The friction test was conducted on OFITE lubricity tester (e.g., supplied by OFI Testing Equipment, Inc., Product Code: 112-00). The test involved a specialized apparatus, which comprises a rotating ring and a stationary block. Both components are made of hardened steel and are carefully positioned to ensure controlled contact under test conditions. The test fluids were initially applied evenly to the contact surfaces of both the ring and the block. A predefined force of 150 inch-pounds (in-lb), equivalent to about 600 psi (e.g., 4,137 kPa), was exerted perpendicularly to the area of contact between the two surfaces. The ring was set to rotate at a constant speed of 60 revolutions per minute (rpm). During the friction test, the torque needed to maintain the constant rotation of the ring was measured. The measurement reflected the amount of power needed to counteract the frictional resistance created by the test fluid between the ring and block. The primary metric derived from the test is the coefficient of friction ($\mu$), calculated as the ratio of the frictional force to the applied perpendicular load. A lower coefficient of friction shows desirable lubricating properties of the fluid, suggesting that it may effectively reduce friction and wear under the simulated conditions. Furthermore, friction reduction performance of both surfactants was evaluated at different temperatures to record how friction may be impacted either by increasing or decreasing the temperatures. Table 4 shows the lubricity results of a completion fluid comprising surfactant A mixed in the NaCl brine at different temperature conditions, while Table 5 shows the lubricity results of a completion fluid comprising surfactant B in the NaCl brine. Table 6 shows the lubricity results of a completion fluid comprising surfactant A mixed in the $CaCl_2$ brine at different temperature conditions, while Table 7 shows the lubricity results of a completion fluid comprising surfactant B in the $CaCl_2$ brine. Both fluids exhibited a reduction in torque prior to hot rolling. The torque reduction trend for surfactant A in NaCl brine indicated an overall increase with rising temperatures, as shown in FIG. 3. The synthesized surfactant demonstrated less decline in torque reduction at higher temperatures. At each evaluated temperature, surfactant A achieved better torque reduction than surfactant B.

TABLE 4

Lubricity results of surfactant A mixed in NaCl brine

Calibration factor 33.4
Correction factor 1.018

| Sample | Meter reading obtained | Lubricity coefficient | Percentage reduction | Percentage reduction BHR & AHR |
|---|---|---|---|---|
| Blank (without surfactant) | 28.6 | 0.2911 | — | — |
| Before-hot-rolled (BHR) (with surfactant) | 12.7 | 0.1293 | 125% | — |
| After hot rolled (AHR) @ 150° F. | 7.7 | 0.0784 | 271% | 65% |
| AHR @ 250° F. | 8 | 0.0814 | 258% | 59% |
| AHR @ 300° F. | 6.4 | 0.0651 | 347% | 98% |

TABLE 5

Lubricity results of surfactant B mixed in NaCl brine

Calibration factor 32.2
Correction factor 1.0559

| Sample | Meter reading obtained | Lubricity coefficient | Percentage reduction | Percentage reduction BHR & AHR |
|---|---|---|---|---|
| Blank (without surfactant) | 28.6 | 0.2911 | — | — |
| BHR (with surfactant) | 13 | 0.1323 | 120% | — |
| AHR @ 150° F. | 7.9 | 0.0804 | 262% | 61% |
| AHR @ 250° F. | 8.1 | 0.0825 | 253% | 57% |
| AHR @ 300° F. | 10.1 | 0.1028 | 183% | 26% |

TABLE 6

Lubricity results of surfactant A mixed in $CaCl_2$ brine

Calibration factor 35
Correction factor 0.9714

| Sample | Meter reading obtained | Lubricity coefficient | Percentage reduction | Percentage reduction BHR & AHR |
|---|---|---|---|---|
| Blank (without surfactant) | 18 | 0.1832 | — | — |
| BHR (with surfactant) | 18.6 | 0.1893 | 54% | — |
| AHR @ 150° F. | 7.4 | 0.0753 | 286% | 72% |
| AHR @ 250° F. | 7.1 | 0.0723 | 303% | 79% |
| AHR @ 300° F. | 9.8 | 0.0998 | 192% | 30% |

TABLE 7

Lubricity results of Surfactant B mixed in $CaCl_2$ brine

Calibration factor 35
Correction factor 0.9714

| Sample | Meter reading obtained | Lubricity coefficient | Percentage reduction | Percentage reduction BHR & AHR |
|---|---|---|---|---|
| Blank (without surfactant) | 18 | 0.1832 | — | — |
| BHR (with surfactant) | 18.6 | 0.1893 | 54% | — |
| AHR @ 150° F. | 7.1 | 0.0723 | 303% | 79% |
| AHR @ 250° F. | 7.4 | 0.0753 | 286% | 72% |
| AHR @ 300° F. | 9.8 | 0.0998 | 192% | 30% |

Example 4: Thermal Stability of Completion Fluids

Figure 5A:
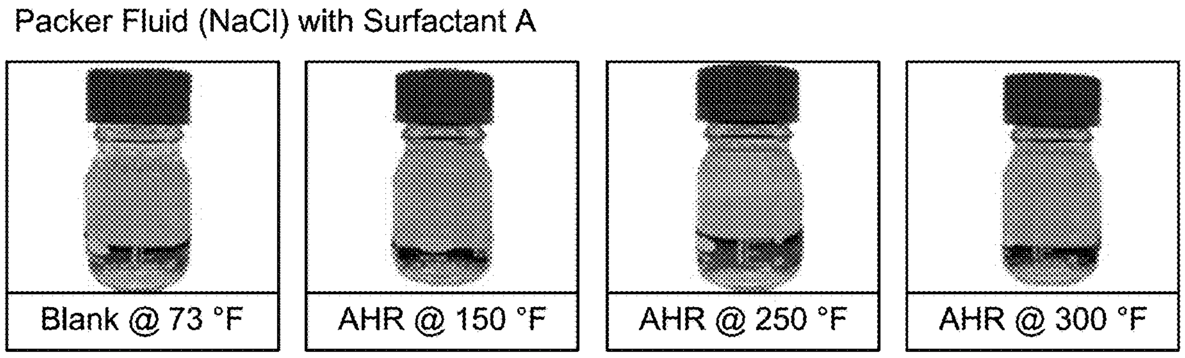
FIG. 5A shows thermal stability test of NaCl solution as a packer fluid, with surfactant A at different temperatures, according to certain embodiments.
Figure 5B:
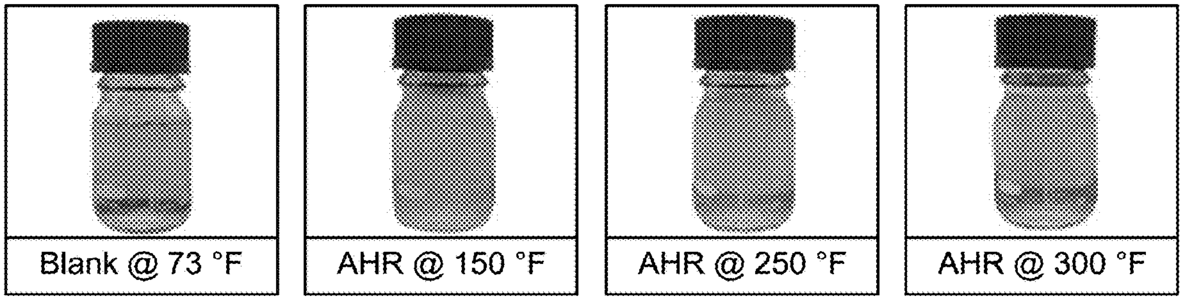
FIG. 5B shows thermal stability test of NaCl solution as packer fluid with surfactant B at different temperatures, according to certain embodiments.
Figure 5C:
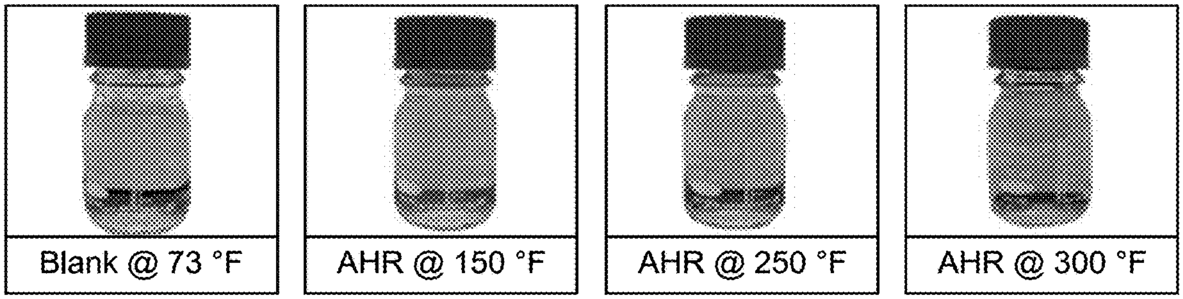
FIG. 5C shows thermal stability test of $CaCl_2$ solution as tubing fluid with surfactant A at different temperatures, according to certain embodiments.
Figure 5D:
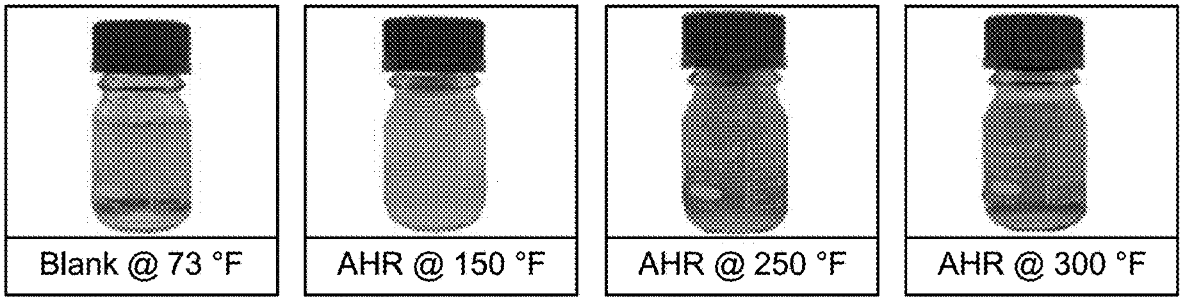
FIG. 5D shows thermal stability test of a $CaCl_h$ solution as a tubing fluid with surfactant B at different temperatures, according to certain embodiments.

The thermal stability of both completion fluids was analyzed at different temperatures and changes such as color alteration, phase separation, and reductions in density and viscosity were observed following thermal aging. Analysis of the completion fluids involved examining the samples before and after hot rolling. Both surfactants maintained homogeneity with NaCl and $CaCl_2$ brines, even after being subjected to hot rolling at various temperatures, as shown in FIG. 5A through FIG. 5D. There was no phase separation observed at different temperature conditions. Surfactant A showed no sign of degradation and phase separation. Visual assessments before and after the thermal treatment revealed a notable color change. Surfactant A remained color-stable in NaCl brine across different temperatures but showed slight darkening in $CaCl_2$ brine, as shown in FIGS. 5A through 5C. Surfactant B lightened in NaCl brine but darkened in $CaCl_2$ brine between 150 and 250° F., with no substantial color change at 300° F., as shown in FIGS. 5B through 5D Numerous modifications and variations of the present disclosure are possible in light of the above teachings. It is therefore to be understood that within the scope of the appended claims, the invention may be practiced otherwise than as specifically described herein.

The invention claimed is:

1. A method of completing a wellbore in a hydrocarbon-containing subterranean formation, comprising:

injecting a completion fluid into the wellbore to form a hydrostatic gradient at a hydrocarbon-producing depth in the wellbore, wherein the completion fluid is an aqueous solution comprising 10 to 20 w/v % of a dicationic surfactant of Formula (I) having an alkyl linker and a lipophilic tail Formula (I)

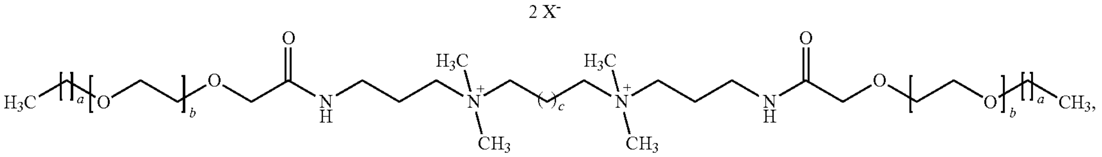

where:

c is from 1 to 20 and represents the alkyl linker,

X represents an anionic counterion, a is from 1 to 20 and represents the lipophilic tail, and b is from 1 to 20, and wherein the completion fluid reduces a torque of the wellbore by at least 25% at a temperature of 150 to 300° F. at a surfactant loading of 10 wt./vol. % based on the total volume of the completion fluid.

2. The method of claim 1, wherein the completion fluid is an aqueous solution comprising a brine comprising at least one selected from the group consisting of an alkali metal salt and an alkaline earth metal salt, and wherein a is from 10 to 20, b is from 10 to 16, and c is from 6 to 8.

3. The method of claim 1, wherein the completion fluid has a density of 1 to 3 g/cm$^3$.

4. The method of claim 1, wherein the completion fluid has a viscosity of 1 to 20 cP.

5. The method of claim 1, further comprises, before the injecting:

inserting a steel casing string into the wellbore, then sealing a perimeter of the wellbore formed by the casing string by pumping a cement slurry into an annulus between the wellbore wall and the steel casing string;

curing the cement slurry to encase the perimeter of the wellbore in a cement coating; and inserting a perforating gun into the wellbore and shooting the perforating gun to create a plurality of openings in the perimeter of the wellbore and the cement coating.

6. The method of claim 1, wherein the anionic counterion is at least one selected from the group consisting of chlorine and bromine.

7. The method of claim 1, wherein the completion fluid is an aqueous solution comprising a brine comprising at least one selected from the group consisting of NaCl, KCl, $NaHCO_3$, NaOH, $CaCl_2$, $CaCO_3$, $MgSO_4$, $BaSO_4$, $SrCl_2$, KOH, $LiHCO_3$, $Na_2CO_3$, and $KNO_3$.

8. The method of claim 1, wherein the completion fluid has a density of 1.2 to 2 g/cm$^3$.

9. The method of claim 1, wherein the anionic counterion is bromine.

10. The method of claim 1, wherein the completion fluid has a lubricity coefficient of 0.05 to 0.3 at a temperature of 150 to 300° F.

11. The method of claim 1, wherein the completion fluid further comprises at least one additive selected from the group consisting of emulsifiers, viscosifiers, fluid-loss control agents, corrosion inhibitors, defoamers, anti-scalants, deflocculants, lubricants, wellbore strengthening materials, high temperature/high pressure control additives, and coating enhancement agents.

12. The method of claim 1, wherein the completion fluid is an aqueous solution comprising a brine comprising at least one selected from the group consisting of NaCl and $CaCl_2$.

13. The method of claim 1, wherein the completion fluid is an aqueous solution comprising a brine comprising NaCl.

14. The method of claim 1, wherein the completion fluid has a lubricity coefficient of 0.06 to 0.13 at a temperature of 150 to 300° F.

15. The method of claim 1, wherein the completion fluid reduces a torque of the wellbore by at least 50% at a temperature of 150 to 300° F.

16. The method of claim 1, wherein the completion fluid is an aqueous solution comprising a brine comprising $CaCl_2$.

17. The method of claim 1, wherein the completion fluid has a density of 1.2 to 1.6 g/cm$^3$.

18. The method of claim 1, wherein the completion fluid has a viscosity of 1 to 6 cP.

19. The method of claim 1, wherein the completion fluid has a density of 50 to 75.

20. The method of claim 1, wherein the completion fluid has a lubricity coefficient of 0.07 to 0.19 at a temperature of 150 to 300° F.

* * * * *